Nov. 18, 1952  NOBUYOSHI KIMURA  2,618,090
COMBINATION FISHING ROD SUPPORT
Filed Jan. 11, 1952  2 SHEETS—SHEET 1
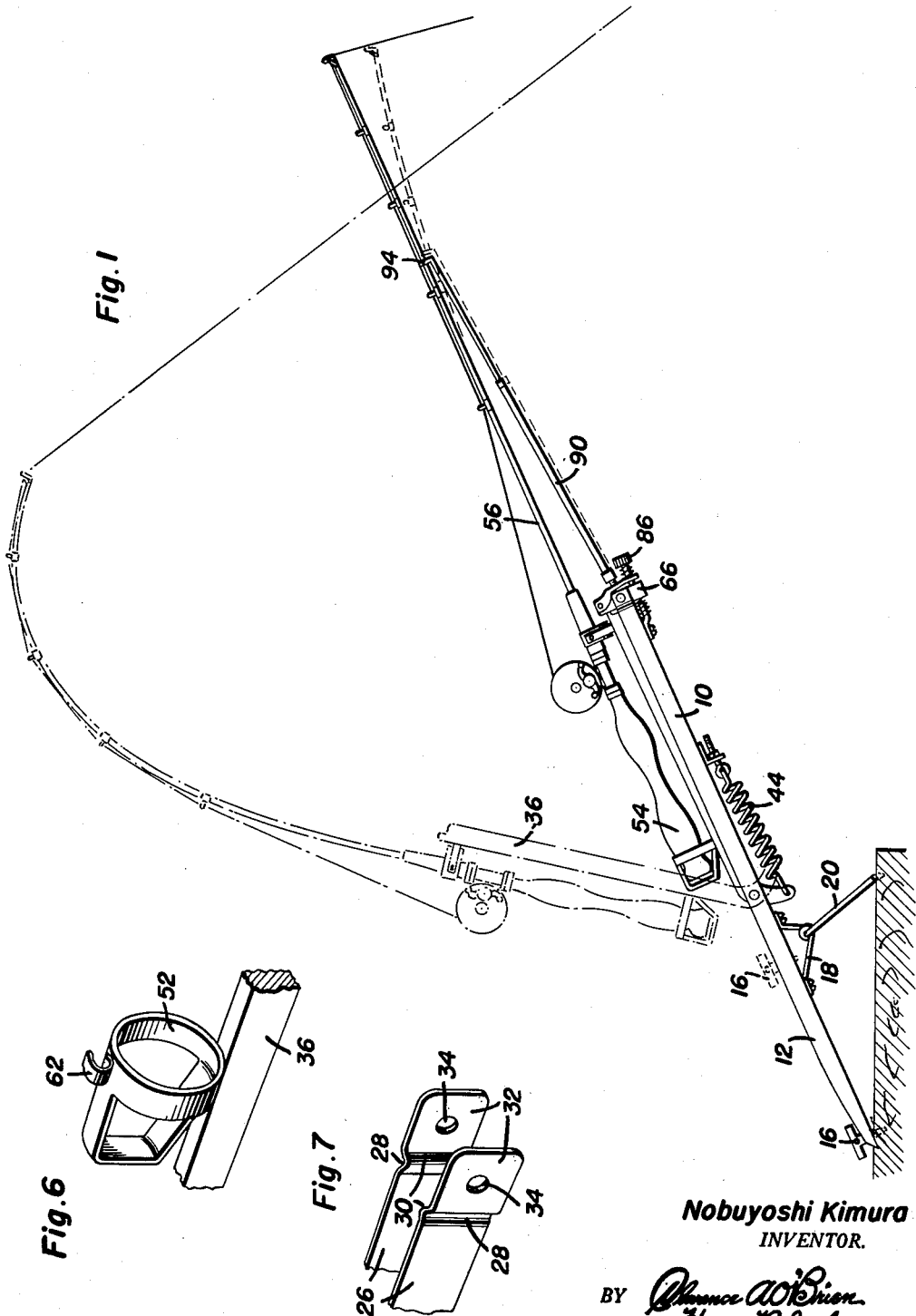
Nobuyoshi Kimura
INVENTOR.

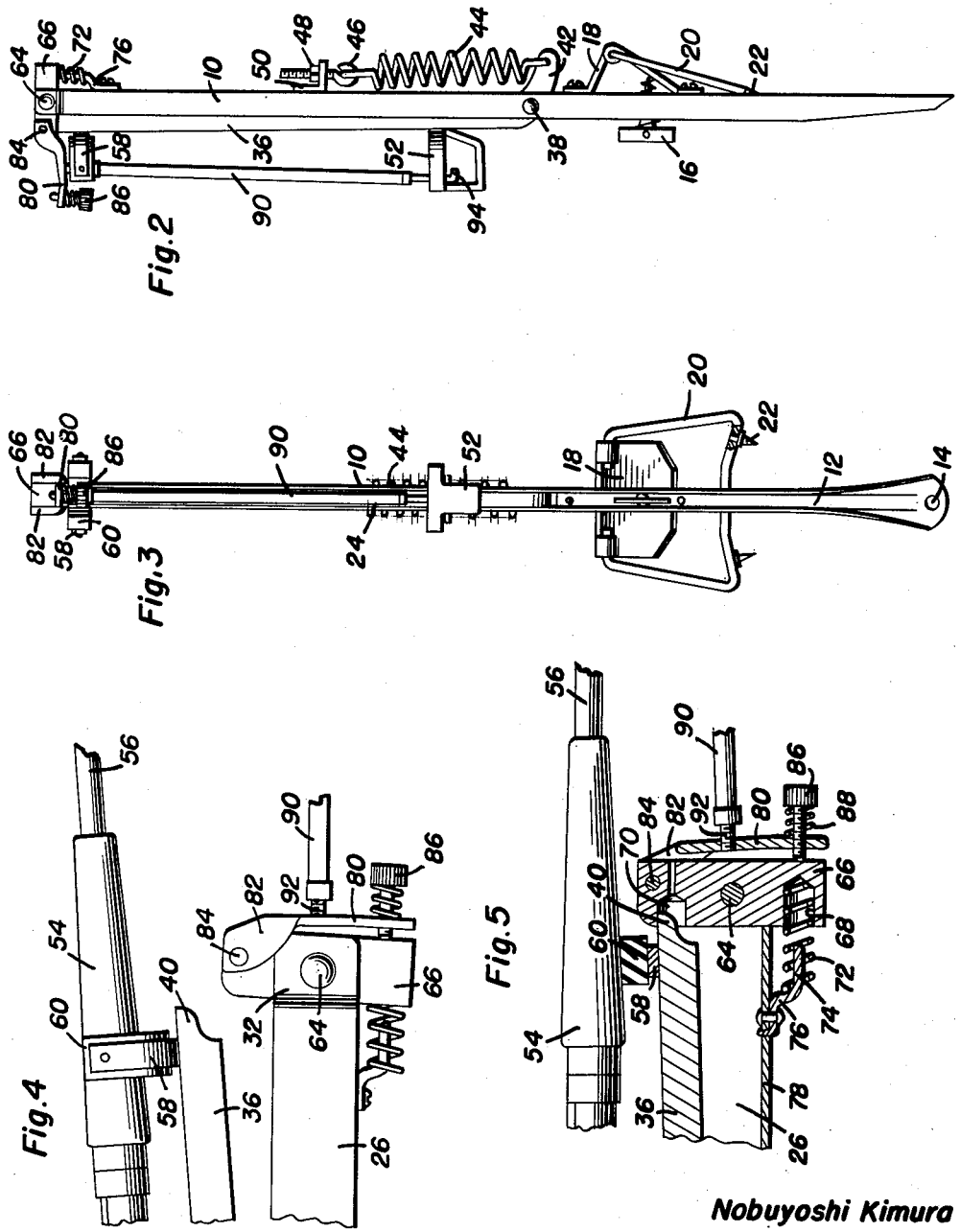

Patented Nov. 18, 1952

2,618,090

UNITED STATES PATENT OFFICE 2,618,090

COMBINATION FISHING ROD SUPPORT

Nobuyoshi Kimura, San Francisco, Calif.

Application January 11, 1952, Serial No. 265,960

10 Claims. (Cl. 43—15)

This invention comprises novel and useful improvements in a combination fish rod support and more specifically pertains to a fishing rod support having a trigger mechanism for imparting a jerk to a fishing rod in response to the striking of a fishing line by a fish.

The primary purpose of this invention is to provide a fishing rod holder having a trigger mechanism responsive to the striking of a fish for imparting a sudden jerk to the fishing rod to set the hook in the fish.

A further object of the invention is to provide a fishing rod holder in conformity with the preceding object in which the trigger mechanism shall be directly responsive to a predetermined flexing of the fishing rod by the striking of a fish upon the fishing line.

Yet another object of the invention is to provide a fishing rod holder as set forth in the foregoing objects in which the sensitivity of the trigger mechanism may be readily and easily adjusted to cause the device to accommodate itself to various sizes and types of fish and different fishing conditions.

An additional important object of the invention is to provide a fishing rod support in accordance with the preceding objects in which the trigger rod of the device may be compactly folded against the fishing rod holder and base of the apparatus.

Yet another important object of the invention is to provide a device in conformity with the foregoing objects which shall have an improved trigger mechanism, improved means for adjusting the strength of the trigger controlled mechanism and shall have improved means for adjustably anchoring or supporting the device upon various supporting surfaces.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a side elevational view showing the improved fishing rod support in accordance with this invention, and showing in full lines the position of the device with a fishing rod secured thereto and with the trigger mechanism set and ready for operation, and showing in dotted lines the manner in which the flexing of the fishing rod operates the trigger mechanism and the actuated position of the fishing rod holder after the trigger mechanism has been released;

Figure 2 is a side elevational view of the fishing rod support in its folded or collapsed position for compact transportation and storage;

Figure 3 is a bottom plan view of the device in the position shown in Figure 2;

Figure 4 is a fragmentary elevational view, taken upon an enlarged scale, of portions of the base, fishing rod holder and a fishing rod immediately after the trigger mechanism has been released by the device;

Figure 5 is a view similar to Figure 4 but showing in vertical sectional view the associated parts of the trigger mechanism with the trigger engaged upon the fishing rod holder;

Figure 6 is a perspective detail view of a portion of the fishing rod holder showing the rear fishing rod engaging bracket thereon together with a catch for retaining the trigger rod in the folded position of the latter; and, Figure 7 is a fragmentary perspective detail view of the outer end of the base member of the fishing rod support and to which the trigger mechanism is adapted to be pivotally connected.

Referring now more specifically to the accompanying drawings, wherein like numerals designate similar parts throughout the various views, it will be seen that the novel fishing rod support in accordance with this invention comprises an elongated base indicated generally by the numeral 10 and which at its rear end may include a solid shank portion 12 having a screw-threaded aperture 14 for the reception of a wood screw or the like 16 whereby the rear end of the base may be anchored to a supporting surface such as a wooden flooring, the earth, or the like. Spaced from the screw 16 the shank 12 is further provided with a supporting bracket 18 to which is pivotally connected a rod or wire bail 20 having spikes 22 and constituting the pivotal supporting leg assembly. This leg assembly may be folded against the base as shown in Figures 2 and 3, or may be opened at selected angular arrangements with respect thereto as shown in Figure 1, to enable the spikes to be driven into the supporting surface. The base may thus be disposed in selected inclined positions as desired.

At its outer end, and for the major portion of its length, the base 10 is provided with a longitudinal slot 24 which may be constructed in any suitable manner. However, it is preferred to form the slot by forming the outer portion at least of the base of a pair of longitudinally extending parallel members 26 which may consist of metallic bars or the like.

As shown best in Figure 7, the base side members 26 adjacent their outer ends are provided with a pair of parallel transverse deformations or grooves 28 which upon the inside or adjacent surfaces of the side members provide parallel inwardly extending transverse ribs or projections 30 which constitute stop shoulders for limiting the pivotal movement of the trigger, to be hereinafter described.

At their extremities, the side members 26 are provided with flat terminal portions comprising ears 32, which are apertured as at 34, and which are laterally offset outwardly from the side members 26.

A fishing rod holder is pivotally connected to the base for swinging movement relative thereto. This holder, preferably comprises a substantially flat bar or lever 36 which is positioned within the slot 24 and is pivotally movable therein, the holder being pivotally connected to the base member as by a pivot pin 38.

At its outer end, as shown in Figures 4 and 5, the rod holder is provided with axially extending finger 40 which is adapted to be engaged by the trigger mechanism as set forth hereinafter, while the opposite end of the rod holder is provided with an angularly disposed lever arm 42 which extends through the slot to the opposite side of the base member from the main portion of the rod holder 36, and has connected therewith one end of a tension spring 44.

The other end of this spring is secured to an eye bolt 46 provided with an adjusting nut 48 and which eye bolt extends through an L-shaped bracket or lug 50 secured to the underside of the base side members 26 in any desired manner.

It will thus be apparent that the tension spring 44 yieldingly urges the fishing rod holder from the full line position shown in Figure 1 to the dotted line position shown therein, and this spring action may be varied as to its force by properly adjusting the nut 48 on the eye bolt 46.

Referring now to Figures 1, 2 and 3 it will be apparent that adjacent its rearward portion, that is, adjacent the fulcrum pin 38, the rod holder 36 is provided with a socket member 52 of any desired construction and secured to the rod holder in any desired manner, for receiving the rearward portion of the handle 54 of a fishing rod 56 of any desired construction.

Upon its forward extremity, the rod holder 36 is provided with a forward yoke or supporting bracket 58 provided with a cushioning ring or split ring 60 which is adapted to receive and support the forward portion of the fishing rod handle 54. It will thus be apparent that the rearward portion of the handle may be slid into the socket 52, while the forward portion will rest or seat in the open yoke members 58 and 60.

With further reference to Figure 6, it will be observed that the socket 52 is provided with a hook member 62 upon its exterior surface which constitutes a catch for retaining the trigger rod in a manner to be set forth hereinafter.

Pivotally mounted upon the outer end of the base member 10 as by a pivot pin 64, which is seated in the apertures 34 in the ears 32 of the side members 26, is a body 66 constituting a trigger. This body is thus disposed between the ears 32 and is pivotal about a transverse axis between those ears, and the pivoting movement of the trigger 66 is limited by engagement of surfaces of the same with the previously mentioned ribs or stops 30.

The opposite ends of the trigger overhang or extend beyond what may be termed the top and bottom sides of the base 10, and these extending portions are provided with respective recesses 68 and 70. The recess 70 is adapted to receive the trigger finger 40 of the rod holder 36, as will be clearly apparent from Figure 5, while the recess 68 receives one end of the trigger compression spring 72. The other end of the spring is mounted upon a projecting pin 74 carried by a mounting lug 76 riveted or otherwise secured to a bracket 78 secured to and underlying the bottom surfaces of the side members 26 of the base in any desired manner, as by comprising a web joining the bottom edges of the members 26. The spring 72 urges the trigger in pivotal movement into a position whereby the trigger finger 40 may be received in the trigger recess 70, as shown in Figure 5. The spring thus retains the trigger mechanism in its cocked position.

A lever 80 is provided with parallel lugs 82 at one end thereof which embrace the end of the trigger body 66 which contains the trigger recess 70, these lugs being pivoted to the trigger body as by a pivot pin 84. The opposite end of the lever 80 screw-threadedly receives an adjusting screw 86 which extends through the lever and whose extremity is adapted to abut the trigger body 66 for adjustably limiting the pivotal movement of the lever 80 towards the trigger body 66. A compression spring 88 may surround the adjusting screw 86 to tension the same and resiliently retain the adjusting screw in its adjusted position.

A trigger rod 90 is provided with a screw-threaded extremity 92 which is detachably secured to the lever 80, whereby the trigger rod 90 is pivotally mounted upon and carried by the trigger member 66. This trigger rod may be of any desired construction, as for example, either a solid rod or a tubular rod, and may be of one-piece or telescoping construction as desired. This trigger rod is adapted to underlie the outer portion of the fishing rod 56, and at its outer extremity is provided with an arcuate upstanding yoke or abutment member 94 which is adapted to receive and be engaged by the extremity of the fishing rod 56 when the latter is flexed from the full line to the dotted line position shown in Figure 1.

When the fishing rod is flexed as by a fish striking the fishing line, the flexing movement of the rod 56 will bear against the abutment member 94 and through this member will press against the trigger rod 90 and through the latter will cause a pressure through the lever 80 to the trigger body 66. This pressure will overcome the resistance of the trigger compression spring 72, and thus cause pivoting movement in a clockwise direction of the trigger 66 from the cocked position of Figure 5 to the trigger released position of Figure 4. This pivotal movement of the trigger will disengage the finger 40 of the rod holder from the trigger recess 70 of the trigger, and thus permit the spring 44 to actuate the rod holder from the full line to the dotted line position shown in Figure 1.

It should be here noted that manipulation of the adjusting screw 86 will urge the trigger rod 90 relatively towards or from the fishing rod 56, thus varying the force between the abutment member 94 and the fishing rod 56 and thus determine the amount of flexing necessary for the fishing rod 56 before the trigger mechanism is operated. This amplitude of flexing movement of the fishing rod 56 is of course dependent upon the force exerted by a fish upon the line when a fish strikes the hook. By this means the device may be readily adjusted to be sensitive to various predetermined forces applied to the fishing line, and thus may be very precisely adapted for particular fish, for fishing in particular waters and the like.

It will be noted that the lever 80 being pivoted upon the trigger, may be readily folded in a counterclockwise direction whereby the trigger rod will be folded backwardly upon the base and rod holder, and whereby the extremity of the trigger rod may be engaged in the catch 62 on the socket 52 for retaining the device in its collapsed position. It will be further apparent that by this hinged connection the trigger may remained cocked as shown in Figures 2 and 5, since movement of the trigger rod in a counterclockwise direction will not tend to release the trigger, and opening the trigger rod from its collapsed to its operative position will likewise have no effect upon the cocked trigger until pressure is applied by the adjusting screw 86 against the surface of the trigger to overcome the resistance of the compression spring 72.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having thus described the invention, what is claimed as new is:

1. A fishing rod support comprising a base, a fish rod holder pivoted to said base, means resiliently urging said holder into one extreme of its pivotal movement, a trigger on said base releasably retaining said rod holder at the other extreme of its pivotal movement, a trigger rod mounted upon said trigger, and an abutment on said trigger rod positioned for engagement by a fishing rod mounted in said holder when the latter is flexed.

2. A fishing rod support comprising a base, a fish rod holder pivoted to said base, means resiliently urging said holder into one extreme of its pivotal movement, a trigger on said base releasably retaining said rod holder at the other extreme of its pivotal movement, a trigger rod mounted upon said trigger, and an abutment on said trigger rod positioned for engagement by a fishing rod mounted in said holder when the latter is flexed, said base having a longitutdinal slot, said rod holder being pivoted in said slot and having an angularly disposed arm extending laterally from said slot, said resilient means engaging said arm and said base.

3. A fishing rod support comprising a base, a fish rod holder pivoted to said base, means resiliently urging said holder into one extreme of its pivotal movement, a trigger on said base releasably retaining said rod holder at the other extreme of its pivotal movement, a trigger rod mounted upon said trigger, and an abutment on said trigger rod positioned for engagement by a fishing rod mounted in said holder when the latter is flexed, said base including a pair of parallel longitudinal members, said rod holder being pivoted between said members, and said trigger being pivoted between the outer ends of said member.

4. A fishing rod support comprising a base, a fish rod holder pivoted to said base, means resiliently urging said holder into one extreme of its pivotal movement, a trigger on said base releasably retaining said rod holder at the other extreme of its pivotal movement, a trigger rod mounted upon said trigger, an abutment on said trigger rod positioned for engagement by a fishing rod mounted in said holder when the latter is flexed, said base including a pair of parallel longitudinal members, said rod holder being pivoted between said members, said trigger being pivoted between the outer ends of said member, and a trigger spring connected to said base and trigger and urging the latter into engagement with said rod holder.

5. A fishing rod support comprising a base, a fish rod holder pivoted to said base, means resiliently urging said holder into one extreme of its pivotal movement, a trigger on said base releasably retaining said rod holder at the other extreme of its pivotal movement, a trigger rod mounted upon said trigger, an abutment on said trigger rod positioned for engagement by a fishing rod mounted in said holder when the latter is flexed, said base including a pair of parallel longitudinal members, said rod holder being pivoted between said members, said trigger being pivoted between the outer end of said member, and a trigger spring connected to said base and trigger and urging the latter into engagement with said rod holder, said trigger having a recess, and said rod holder having a finger receivable in said recess.

6. A fishing rod support comprising a base, a fish rod holder pivoted to said base, means resiliently urging said holder into one extreme of its pivotal movement, a trigger on said base releasably retaining said rod holder at the other extreme of its pivotal movement, a trigger rod mounted upon said trigger, an abutment on said trigger rod positioned for engagement by a fishing rod mounted in said holder when the latter is flexed, said base including a pair of parallel longitudinal members, said rod holder being pivoted between said members, said trigger being pivoted between the outer ends of said member, and a trigger spring connected to said base and trigger and urging the latter into engagement with said rod holder, said trigger having a recess, said rod holder having a finger receivable in said recess, and said trigger spring and said recess being on opposite ends of said trigger and on opposite sides of said base.

7. A fishing rod support comprising a base, a fish rod holder pivoted to said base, means resiliently urging said holder into one extreme of its pivotal movement, a trigger on said base releasably retaining said rod holder at the other extreme of its pivotal movement, a trigger rod mounted upon said trigger, an abutment on said trigger rod positioned for engagement by a fishing rod mounted in said holder when the latter is flexed, a lever pivoted to said trigger, and means for adjusting pivotal movement of said lever relative to said trigger, said trigger rod being mounted upon said lever.

8. A fishing rod support comprising a base, a fish rod holder pivoted to said base, means resiliently urging said holder into one extreme of its pivotal movement, a trigger on said base releasably retaining said rod holder at the other extreme of its pivotal movement, a trigger rod mounted upon said trigger, an abutment on said trigger rod positioned for engagement by a fishing rod mounted in said holder when the latter is flexed, said base including a pair of parallel longitudinal members, said rod holder being pivoted between said members, said trigger being pivoted between the outer ends of said member, a trigger spring connected to said base and trigger and urging the latter into engagement with said rod holder, a lever pivoted to said trigger, and means for adjusting pivotal movement of said lever relative to said trigger, said trigger rod being mounted upon said lever.

9. A fishing rod support comprising a base, a fish rod holder pivoted to said base, means resiliently urging said holder into one extreme of its pivotal movement, a trigger on said base releasably retaining said rod holder at the other extreme of its pivotal movement, a trigger rod mounted upon said trigger, an abutment on said trigger rod positioned for engagement by a fishing rod mounted in said holder when the latter is flexed, said base including a pair of parallel longitudinal members, said rod holder being pivoted between said members, said trigger being pivoted between the outer ends of said member, a trigger spring connected to said base and trigger and urging the latter into engagement with said rod holder, said trigger having a recess, said rod holder having a finger receivable in said recess, said trigger spring and said recess being on opposite ends of said trigger and on opposite sides of said base, a lever pivoted to said trigger, and means for adjusting pivotal movement of said lever relative to said trigger, said trigger rod being mounted upon said lever.

10. A fishing rod support comprising a base, a fish rod holder pivoted to said base, means resiliently urging said holder into one extreme of its pivotal movement, a trigger on said base releasably retaining said rod holder at the other extreme of its pivotal movement, a trigger rod mounted upon said trigger, an abutment on said trigger rod positioned for engagement by a fishing rod mounted in said holder when the latter is flexed, said rod holder having a catch for receiving said trigger rod, and means pivotally mounting the trigger rod upon the trigger whereby the trigger rod may be folded back against said catch.

NOBUYOSHI KIMURA.

REFERENCES CITED

The following references are of record in the file of this patent:

UNITED STATES PATENTS

| Number | Name | Date |
|---|---|---|
| 2,551,996 | Cherubini | May 8, 1951 |